R. H. ROGERS.
DUMPING APPARATUS FOR CARS.
APPLICATION FILED JAN. 27, 1916.

1,237,099.

Patented Aug. 14, 1917.

Inventor:
Robert H. Rogers,
by
His Attorney.

UNITED STATES PATENT OFFICE.

ROBERT H. ROGERS, OF SCHENECTADY, NEW YORK, ASSIGNOR TO GENERAL ELECTRIC COMPANY, A CORPORATION OF NEW YORK.

DUMPING APPARATUS FOR CARS.

1,237,099.  Specification of Letters Patent.  Patented Aug. 14, 1917.

Application filed January 27, 1916. Serial No. 74,589.

*To all whom it may concern:*

Be it known that I, ROBERT H. ROGERS, a citizen of the United States, residing at Schenectady, county of Schenectady, State of New York, have invented certain new and useful Improvements in Dumping Apparatus for Cars, of which the following is a specification.

The present invention relates to apparatus for dumping cars and is particularly intended for use in dumping grain cars, although it is not necessarily limited thereto.

The object of the invention is to provide an improved apparatus which is of simple structure and which can be operated to quickly dump the contents from a grain car or the like.

For a consideration of what I believe to be novel and my invention, attention is directed to the accompanying specification and the claims appended thereto.

Figure 1:
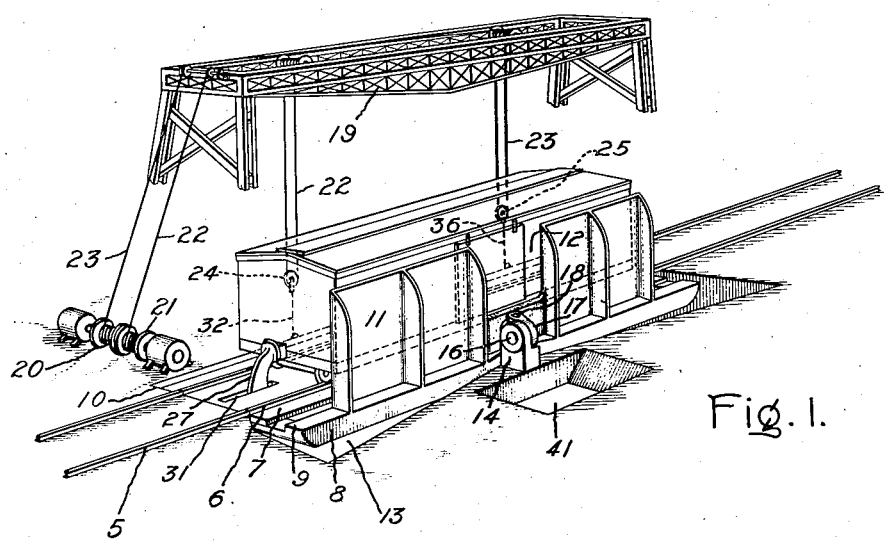
Figure 2:
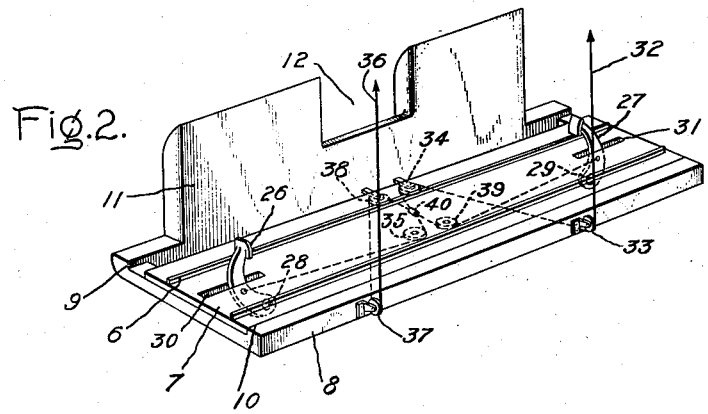
Figure 3:
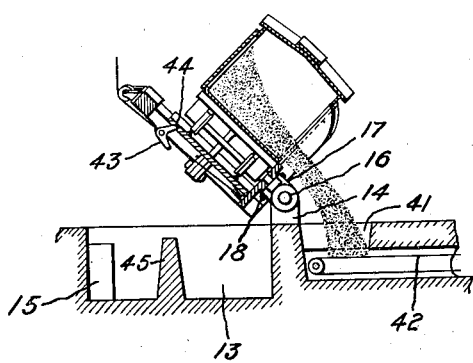
Figure 4:
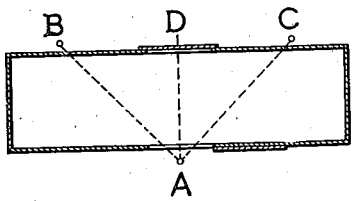

In the accompanying drawing wherein I have shown one form which my invention may take, Figure 1 is a perspective view of the dumping apparatus with a car in place thereon; Fig. 2 is a detail perspective view of the carrying cradle; Fig. 3 is a sectional view illustrating the dumping of a car; and Fig. 4 is a diagrammatic view illustrating the axes about which the cradle and car are tilted and rocked.

Referring to the drawing, 5 indicates a car track having a section 6 of somewhat greater length than the cars to be dumped, which is mounted on a sliding carrier 7 supported on a cradle 8. The carrier 7 slides crosswise of the cradle which has two flanges 9 and 10 to limit the carrier's movements. On the one side, the cradle is also provided with a wall 11 against which the side of the car is held when being dumped. This wall has an opening 12 which is in line with the car door, and through which the grain or other contents of the car is dumped. The cradle 8 is supported over a pit 13 by a post 14 on one side and by a suitable support 15 (Fig. 3) on the other, such support being located in the pit 13. The supporting post 14 is on the side toward which the car moves in being dumped and is located at substantially the center of the cradle. The cradle is connected to the post by a universal joint comprising a horizontal pivot pin 16 on the post to which a member 17 is pivoted, and a vertical pivot pin 18 on the member to which cradle 8 is pivoted. 19 indicates a superstructure for a hoisting apparatus and 20 and 21 motor operated hoisting drums on which wind cables 22 and 23. These cables have their pulleys 24 and 25 connected to the cradle 8 for tilting and rocking it on its universal support. 26 and 27 indicate two clamping members pivoted at 28 and 29 on the carrier and projecting through slots 30 and 31 therein. These clamping members may be adjustable and are arranged to clamp the ends of a car, preferably on the bumpers, when the car is to be unloaded. When released they fall back into the slots 30 and 31 out of the way. They may be moved from inoperative to clamping position in any suitable manner. In the present instance I have shown them as being operated by the cable mechanism as this gives a very simple arrangement. I also preferably arrange the carrier 7 to be slid from the position shown in Fig. 1 to the dumping position as shown in Fig. 3 by the cable mechanism. To this end I provide a cable 32, as a wire rope, which extends from the hook of pulley 24 over the pulley 33 on the edge of cradle 8 across under the cradle around a pulley wheel 34 carried by wall 11, thence around a pulley wheel 35 on the carrier 7 to the clamping member 26. I likewise provide a second cable 36 which extends from the hook of pulley 25 around pulley wheels 37, 38 and 39 to the clamping member 27. The two cables 32 and 36 are fastened to each other at 40 by a suitable cable clamp so that they always move together and by the same amount. This is necessary in order to insure equal movements of the two clamping members 26 and 27. From this it will be clear that when the cables 22 and 23 are wound up the first effect will be to pull the clamping members 26 and 27 from inoperative to clamping position, after which the carried will be slid from the position as shown in Fig. 1 to the position shown in Fig. 3 where it engages the stop 10 and brings the car into engagement with the wall 11. A further movement of the cables then tilts the cradle on its universal support.

41 is a hopper into which the grain or other material is dumped, 42 (Fig. 3) indicating diagrammatically a carrier or conveyer for removing it to the point where it is to be stored.

The carrier 7 is moved from the position as shown in Fig. 3 back to its normal position (Fig. 1) by means of one or more bell crank levers 43 pivoted to the cradle below the carrier and engaging at one end a slot in the bottom of the carrier as indicated at 44 (Fig. 3). Beneath each lever is a post 45 located in the pit 13 which the other end of the lever 43 engages, thus turning it and forcing the carrier across the cradle.

The operation is as follows: A car to be unloaded is run down the track 5, which is preferably arranged with a slight grade so as to facilitate the handling of the cars, until the car door is in line with the opening 12. The cable mechanism is then operated to wind up the cables 22 and 23, both being operated at the same time. This, as already explained above, first acts to move the clamping members 26 and 27 to clamping position against the opposite ends of the car, after which the carrier 7 is slid across the cradle 8 to a position where the carrier engages the stop 10 and the side of the car rests against the wall 11. The car door is then opened, after which the cables are further wound up so as to tilt the cradle on the pivot 16. The cradle will be tilted until the car stands at an angle of about 45°. This will cause the grain or other material at the center of the car to spill out through the door into the hopper 34. This is illustrated in Fig. 3, and may be considered the first dumping operation. In performing it both cables are operated simultaneously. The second dumping operation consists in holding the one cable, as for example 22, taut while the other 23 is further wound up. This will elevate the one end of the car spilling the material in such end out through the door. The third operation then consists in lowering this end of the car and raising the other end to empty it. And the fourth and last operation consists in lowering the cradle to its original position.

Fig. 4 illustrates the axes about which the car turns during the second, third and fourth operations. A indicates the point of the universal support, B the one cable connection, and C the other. During the second operation when B is raised, the points A and C being stationary, the car tilts on the axis AC, the upper left-hand corner being raised and the lower right-hand corner being lowered. During the third operation when B is lowered, C at the same time being raised, the car tilts on the axis AD. In the third operation when C is lowered, the car tilts along the axis AB until it is brought to its normal position. As the cradle approaches horizontal position the bell-crank lever or levers 43 engage the top or tops of the post or posts 45 shifting the carrier across the cradle back to its original position. As soon as the cradle reaches its lowermost position the clamping members 26 and 27 will be released and fall by gravity back out of the way. The empty car is then removed and a full one run into its place and the operation repeated.

In operation, as soon as the hoisting mechanism has lifted the cradle clear of its support 15, the cradle is then sustained by a three point suspension; i. e., the universal support on the one side and the two cable supports on the other. This gives the greatest flexibility for the movements of the cradle and car.

It will be understood that the motor operated hoisting drums are operated from suitable controllers as is usual. These are not shown in the drawing as their specific structure forms no part of the present invention. I preferably employ two separate motors, one for each cable, and place each under the control of an independent controller as this gives complete control of the movements of the cradle at all times, both as to rate and amount of tipping. This arrangement is desirable as some materials being unloaded may flow more readily than others. It will be understood, however, that my invention is not necessarily limited to this arrangement, nor is it necessarily limited in its broader aspects to the use of cables and hoisting mechanism as the cycle of movements may be carried out by other means.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a dumping apparatus, the combination of a cradle, a universal support for it located centrally and at one side thereof, and means for tipping and rocking the cradle on said universal support.

2. In a dumping apparatus, the combination of a cradle, a universal support for it located centrally and at one side thereof, clamping means for clamping a car on the cradle, and means for tilting and rocking the cradle on said universal support.

3. In a dumping apparatus, the combination of a pit, a cradle supported over it, the support on one side comprising a universal joint, a vertical wall at one side of the cradle, a section of track on the cradle which is slidable thereon to bring a car into engagement with the wall, means for clamping a car to the section of the track, and means for tilting and rocking the cradle on the universal joint.

4. In a car dumping apparatus, the combination of a track, a carrier upon which a section of said track is mounted, a cradle for the carrier having a vertical wall, said carrier being slidable on the cradle to bring a car into engagement with the wall, means for clamping a car to the track section, a universal pivoted support for the cradle, and means for first moving the carrier on the cradle to bring a car into engagement with said vertical wall and then tilting the cradle sidewise and rocking it endwise on said universal support.

5. In a car dumping apparatus, the combination of a track, a carrier upon which a section of said track is mounted, a cradle for the carrier having a vertical wall, said carrier being slidable on the cradle to bring a car into engagement with the wall, means for clamping a car to the track section, a universal pivoted support for the cradle, and cable mechanism for first operating the clamping means and then tilting the cradle sidewise and rocking it endwise on said universal support.

6. In a car dumping apparatus, the combination of a cradle having a universal support, means for clamping a car thereon, and means which first actuates the clamping means and then tilts and rocks the cradle on said support.

7. In a car dumping apparatus, the combination of a cradle having a universal support, means for clamping a car thereon, and a cable connected to the clamping means and to the cradle for first operating the clamping means and then tilting and rocking the cradle on its universal support.

8. In a car dumping apparatus, the combination of a cradle having a universal support on one side located at the central portion thereof, and two cables forming supports on the other side, one located adjacent each end, means for clamping a car on the cradle, hoisting mechanism for the cables, and means for operating the hoisting mechanism.

9. In a car dumping apparatus, the combination of a cradle having a universal support on one side located at the central portion thereof, and two cables forming supports on the other side, one located adjacent each end, car clamping means connected with said cables, hoisting mechanism for the cables, and means for operating the hoisting mechanism to clamp a car on the cradle and to tilt and rock the cradle on its universal support.

10. In a car dumping apparatus, the combination of a cradle having a universal support on one side located at the central portion thereof, and two cables forming supports on the other side, one located adjacent each end, a wall on one side of the cradle, a carrier on the cradle which is slidable crosswise thereof, clamping members on the carrier, said carrier and clamping members being connected to said cables so as to be operated thereby, hoisting mechanism for the cables, and means for operating the hoisting mechanism to bring the clamping members into engagement with a car, slide the carrier on the cradle to bring the side of the car against the wall, and tilt and rock the cradle on its universal support.

In witness whereof, I have hereunto set my hand this 25th day of January, 1916.

ROBERT H. ROGERS.